United States Patent
Sloane et al.

(10) Patent No.: US 12,160,435 B2
(45) Date of Patent: *Dec. 3, 2024

(54) SYSTEM FOR DYNAMIC NODE ANALYSIS FOR NETWORK SECURITY RESPONSE

(71) Applicant: BANK OF AMERICA CORPORATION, Charlotte, NC (US)

(72) Inventors: Brandon Sloane, Indian Land, SC (US); Michael Ogrinz, Easton, CT (US); Charles Edward Dudley, Concord, NC (US)

(73) Assignee: BANK OF AMERICA CORPORATION, Charlotte, NC (US)

( * ) Notice: Subject to any disclaimer, the term of this patent is extended or adjusted under 35 U.S.C. 154(b) by 562 days.

This patent is subject to a terminal disclaimer.

(21) Appl. No.: 17/542,973

(22) Filed: Dec. 6, 2021

(65) Prior Publication Data

US 2023/0179614 A1     Jun. 8, 2023

(51) Int. Cl.
| | |
|---|---|
| *H04L 9/40* | (2022.01) |
| *G06N 5/022* | (2023.01) |
| *H04L 41/0816* | (2022.01) |
| *H04L 41/147* | (2022.01) |

(52) U.S. Cl.
CPC ......... *H04L 63/1425* (2013.01); *G06N 5/022* (2013.01); *H04L 41/0816* (2013.01); *H04L 41/147* (2013.01); *H04L 63/1433* (2013.01); *H04L 63/20* (2013.01); *H04L 63/205* (2013.01)

(58) Field of Classification Search
CPC . H04L 63/1425; H04L 63/1433; H04L 63/20; G06N 5/022

USPC .......................................................... 726/25
See application file for complete search history.

(56) References Cited

U.S. PATENT DOCUMENTS

| | | | |
|---|---|---|---|
| 10,015,665 | B2 * | 7/2018 | Chastain ................. G06F 21/79 |
| 10,410,235 | B2 | 9/2019 | Faith |
| 10,484,178 | B2 | 11/2019 | Andrade |
| 10,489,565 | B2 | 11/2019 | Jurss et al. |
| 10,700,875 | B1 | 6/2020 | Daruwalla et al. |
| 10,796,016 | B2 | 10/2020 | Legler |
| 10,896,419 | B2 | 1/2021 | Sivashanmugam et al. |
| 10,911,423 | B2 | 2/2021 | Kim et al. |
| 10,915,937 | B1 | 2/2021 | Hecht |
| 11,068,898 | B2 | 7/2021 | Allen |
| 11,232,449 | B1 | 1/2022 | Hecht |

(Continued)

*Primary Examiner* — James E Springer
(74) *Attorney, Agent, or Firm* — Moore & Van Allen PLLC; Anup Shrinivasan Iyer (57) ABSTRACT

Systems, computer program products, and methods are described herein for dynamic node analysis for network security response. The present invention is configured to detect, using a node analysis engine, a change in a network security protocol associated with a first node within a distributed network; extract information associated with the change in the network security protocol associated with the first node; identify one or more adjacent nodes with a first degree of separation from the first node in response to detecting the change; determine a first set of changes to the network security protocols for the one or more adjacent nodes based on at least the information associated with the change in the network security protocol of the first node; and automatically implement the first set of changes to the network security protocols of the one or more adjacent nodes with the first degree of separation from the first node.

17 Claims, 2 Drawing Sheets

(56) References Cited

U.S. PATENT DOCUMENTS

| | | |
|---|---|---|
| 11,368,460 B2 | 6/2022 | Vanguri et al. |
| 2011/0029428 A1 | 2/2011 | Song et al. |
| 2011/0142217 A1* | 6/2011 | Goldfarb ............... H04M 15/00 |
| | | 379/126 |
| 2013/0339248 A1 | 12/2013 | Hubert et al. |
| 2018/0225656 A1 | 8/2018 | Ray et al. |
| 2018/0322480 A1 | 11/2018 | Solis Monsanto |
| 2019/0266600 A1 | 8/2019 | R |
| 2020/0052897 A1 | 2/2020 | Girish et al. |
| 2020/0175496 A1 | 6/2020 | Finke et al. |
| 2020/0358771 A1 | 11/2020 | Vanguri et al. |
| 2021/0383377 A1 | 12/2021 | Zhou et al. |
| 2022/0109679 A1* | 4/2022 | Takano ................. H04L 63/205 |

* cited by examiner

SYSTEM FOR DYNAMIC NODE ANALYSIS FOR NETWORK SECURITY RESPONSE

FIELD OF THE INVENTION

The present invention embraces a system for dynamic node analysis for network security response.

BACKGROUND

Network security refers to a set of rules and/or configurations designed to protect the integrity, confidentiality, and accessibility of nodes within a computer network and data using both software and hardware technologies.

There is a need for a system for dynamic node analysis for network security response to determine the extent of potential exposure and to bolster overall safety.

SUMMARY

The following presents a simplified summary of one or more embodiments of the present invention, in order to provide a basic understanding of such embodiments. This summary is not an extensive overview of all contemplated embodiments and is intended to neither identify key or critical elements of all embodiments nor delineate the scope of any or all embodiments. Its sole purpose is to present some concepts of one or more embodiments of the present invention in a simplified form as a prelude to the more detailed description that is presented later.

In one aspect, a system for dynamic node analysis for network security response is presented. The system comprising: at least one non-transitory storage device; and at least one processing device coupled to the at least one non-transitory storage device, wherein the at least one processing device is configured to: detect, using a node analysis engine, a change in a network security protocol associated with a first node within a distributed network; extract information associated with the change in the network security protocol associated with the first node; identify one or more adjacent nodes with a first degree of separation from the first node in response to detecting the change; determine a first set of changes to the network security protocols for the one or more adjacent nodes based on at least the information associated with the change in the network security protocol of the first node; and automatically implement the first set of changes to the network security protocols of the one or more adjacent nodes with the first degree of separation from the first node.

In some embodiments, the network security protocol comprises at least one or more security controls, wherein the one or more security controls comprises at least a timeout adjustment, an authentication escalation, a re-authentication requirement, a bandwidth restriction adjustment, and/or a communication technology requirement.

In some embodiments, the at least one processing device is further configured to: continuously monitor, using the node analysis engine, the network security protocols associated with the one or more nodes within the distributed network; and detect the change in the network security protocol associated with the first node based on at least the continuous monitoring.

In some embodiments, determining the first set of changes further comprises: initiating a machine learning model on the information associated with the change in the network security protocol associated with the first node; classifying, using the machine learning model, the change in the network security protocol associated with the first node into one or more classes; retrieving one or more preset changes to the network security protocols associated with the one or more classes; and determining the first set of changes to the network security protocols for the one or more adjacent nodes from the one or more preset changes.

In some embodiments, the at least one processing device is further configured to: retrieve, from a data repository, one or more detected changes to the network security protocols associated with one or more nodes; retrieve, from the data repository, one or more sets of changes to the network security protocols of the one or more adjacent nodes with the first degree of separation from the one or more nodes implemented in response to the one or more detected changes; initiate a machine learning algorithm on the one or more detected changes to the network security protocols associated with the one or more nodes and one or more sets of changes to the network security protocols of the one or more adjacent nodes with the first degree of separation from the one or more nodes; and train, using the machine learning algorithm, the machine learning model, wherein training further comprises determining one or more classification parameters for the machine learning model.

In some embodiments, the at least one processing device is further configured to: classify, using the one or more classification parameters, the change in the network security protocol associated with the first node into the one or more classes.

In some embodiments, the at least one processing device is further configured to: identify one or more adjacent nodes with a second degree of separation from the first node in response to detecting the change; determine a second set of changes to the network security protocols for the one or more adjacent nodes with the second degree of separation from the first node based on at least the information associated with the change in the network security protocol of the first node and the first set of changes implemented to the network security protocols of the one or more adjacent nodes with the first degree of separation from the first node; and automatically implement the second set of changes to the network security protocols of the one or more adjacent nodes with the second degree of separation from the first node.

In another aspect, a computer program product for dynamic node analysis for network security response is presented. The computer program product comprising a non-transitory computer-readable medium comprising code causing a first apparatus to: detect, using a node analysis engine, a change in a network security protocol associated with a first node within a distributed network; extract information associated with the change in the network security protocol associated with the first node; identify one or more adjacent nodes with a first degree of separation from the first node in response to detecting the change; determine a first set of changes to the network security protocols for the one or more adjacent nodes based on at least the information associated with the change in the network security protocol of the first node; and automatically implement the first set of changes to the network security protocols of the one or more adjacent nodes with the first degree of separation from the first node.

In yet another aspect, a method for dynamic node analysis for network security response is presented. The method comprising: detect, using a node analysis engine, a change in a network security protocol associated with a first node within a distributed network; extract information associated with the change in the network security protocol associated with the first node; identify one or more adjacent nodes with a first degree of separation from the first node in response to detecting the change; determine a first set of changes to the network security protocols for the one or more adjacent nodes based on at least the information associated with the change in the network security protocol of the first node; and automatically implement the first set of changes to the network security protocols of the one or more adjacent nodes with the first degree of separation from the first node.

The features, functions, and advantages that have been discussed may be achieved independently in various embodiments of the present invention or may be combined with yet other embodiments, further details of which can be seen with reference to the following description and drawings.

BRIEF DESCRIPTION OF THE DRAWINGS

Having thus described embodiments of the invention in general terms, reference will now be made the accompanying drawings, wherein:

DETAILED DESCRIPTION OF EMBODIMENTS OF THE INVENTION

Embodiments of the present invention will now be described more fully hereinafter with reference to the accompanying drawings, in which some, but not all, embodiments of the invention are shown. Indeed, the invention may be embodied in many different forms and should not be construed as limited to the embodiments set forth herein; rather, these embodiments are provided so that this disclosure will satisfy applicable legal requirements. Where possible, any terms expressed in the singular form herein are meant to also include the plural form and vice versa, unless explicitly stated otherwise. Also, as used herein, the term "a" and/or "an" shall mean "one or more," even though the phrase "one or more" is also used herein. Furthermore, when it is said herein that something is "based on" something else, it may be based on one or more other things as well. In other words, unless expressly indicated otherwise, as used herein "based on" means "based at least in part on" or "based at least partially on." Like numbers refer to like elements throughout.

As used herein, an "entity" may be any institution employing information technology resources and particularly technology infrastructure configured for processing large amounts of data. Typically, these data can be related to the people who work for the organization, its products or services, the customers or any other aspect of the operations of the organization. As such, the entity may be any institution, group, association, financial institution, establishment, company, union, authority or the like, employing information technology resources for processing large amounts of data.

As described herein, a "user" may be an individual associated with an entity. As such, in some embodiments, the user may be an individual having past relationships, current relationships or potential future relationships with an entity. In some embodiments, a "user" may be an employee (e.g., an associate, a project manager, an IT specialist, a manager, an administrator, an internal operations analyst, or the like) of the entity or enterprises affiliated with the entity, capable of operating the systems described herein. In some embodiments, a "user" may be any individual, entity or system who has a relationship with the entity, such as a customer or a prospective customer. In other embodiments, a user may be a system performing one or more tasks described herein.

As used herein, a "user interface" may be any device or software that allows a user to input information, such as commands or data, into a device, or that allows the device to output information to the user. For example, the user interface includes a graphical user interface (GUI) or an interface to input computer-executable instructions that direct a processing device to carry out specific functions. The user interface typically employs certain input and output devices to input data received from a user second user or output data to a user. These input and output devices may include a display, mouse, keyboard, button, touchpad, touch screen, microphone, speaker, LED, light, joystick, switch, buzzer, bell, and/or other user input/output device for communicating with one or more users.

As used herein, an "engine" may refer to core elements of a computer program, or part of a computer program that serves as a foundation for a larger piece of software and drives the functionality of the software. An engine may be self-contained, but externally-controllable code that encapsulates powerful logic designed to perform or execute a specific type of function. In one aspect, an engine may be underlying source code that establishes file hierarchy, input and output methods, and how a specific part of a computer program interacts or communicates with other software and/or hardware. The specific components of an engine may vary based on the needs of the specific computer program as part of the larger piece of software. In some embodiments, an engine may be configured to retrieve resources created in other computer programs, which may then be ported into the engine for use during specific operational aspects of the engine. An engine may be configurable to be implemented within any general purpose computing system. In doing so, the engine may be configured to execute source code embedded therein to control specific features of the general purpose computing system to execute specific computing operations, thereby transforming the general purpose system into a specific purpose computing system.

As used herein, "authentication credentials" may be any information that can be used to identify of a user. For example, a system may prompt a user to enter authentication information such as a username, a password, a personal identification number (PIN), a passcode, biometric information (e.g., iris recognition, retina scans, fingerprints, finger veins, palm veins, palm prints, digital bone anatomy/structure and positioning (distal phalanges, intermediate phalanges, proximal phalanges, and the like), an answer to a security question, a unique intrinsic user activity, such as making a predefined motion with a user device. This authentication information may be used to authenticate the identity of the user (e.g., determine that the authentication information is associated with the account) and determine that the user has authority to access an account or system. In some embodiments, the system may be owned or operated by an entity. In such embodiments, the entity may employ additional computer systems, such as authentication servers, to validate and certify resources inputted by the plurality of users within the system. The system may further use its authentication servers to certify the identity of users of the system, such that other users may verify the identity of the certified users. In some embodiments, the entity may certify the identity of the users. Furthermore, authentication information or permission may be assigned to or required from a user, application, computing node, computing cluster, or the like to access stored data within at least a portion of the system.

It should also be understood that "operatively coupled," as used herein, means that the components may be formed integrally with each other, or may be formed separately and coupled together. Furthermore, "operatively coupled" means that the components may be formed directly to each other, or to each other with one or more components located between the components that are operatively coupled together. Furthermore, "operatively coupled" may mean that the components are detachable from each other, or that they are permanently coupled together. Furthermore, operatively coupled components may mean that the components retain at least some freedom of movement in one or more directions or may be rotated about an axis (i.e., rotationally coupled, pivotally coupled). Furthermore, "operatively coupled" may mean that components may be electronically connected and/or in fluid communication with one another.

As used herein, an "interaction" may refer to any communication between one or more users, one or more entities or institutions, and/or one or more devices, nodes, clusters, or systems within the system environment described herein. For example, an interaction may refer to a transfer of data between devices, an accessing of stored data by one or more nodes of a computing cluster, a transmission of a requested task, or the like.

As used herein, "machine learning algorithms" may refer to programs (math and logic) that are configured to self-adjust and perform better as they are exposed to more data. To this extent, machine learning algorithms are capable of adjusting their own parameters, given feedback on previous performance in making prediction about a dataset. Machine learning algorithms contemplated, described, and/or used herein include supervised learning (e.g., using logistic regression, using back propagation neural networks, using random forests, decision trees, etc.), unsupervised learning (e.g., using an Apriori algorithm, using K-means clustering), semi-supervised learning, reinforcement learning (e.g., using a Q-learning algorithm, using temporal difference learning), and/or any other suitable machine learning model type. Each of these types of machine learning algorithms can implement any of one or more of a regression algorithm (e.g., ordinary least squares, logistic regression, stepwise regression, multivariate adaptive regression splines, locally estimated scatterplot smoothing, etc.), an instance-based method (e.g., k-nearest neighbor, learning vector quantization, self-organizing map, etc.), a regularization method (e.g., ridge regression, least absolute shrinkage and selection operator, elastic net, etc.), a decision tree learning method (e.g., classification and regression tree, iterative dichotomiser 3, C4.5, chi-squared automatic interaction detection, decision stump, random forest, multivariate adaptive regression splines, gradient boosting machines, etc.), a Bayesian method (e.g., naïve Bayes, averaged one-dependence estimators, Bayesian belief network, etc.), a kernel method (e.g., a support vector machine, a radial basis function, etc.), a clustering method (e.g., k-means clustering, expectation maximization, etc.), an associated rule learning algorithm (e.g., an Apriori algorithm, an Eclat algorithm, etc.), an artificial neural network model (e.g., a Perceptron method, a back-propagation method, a Hopfield network method, a self-organizing map method, a learning vector quantization method, etc.), a deep learning algorithm (e.g., a restricted Boltzmann machine, a deep belief network method, a convolution network method, a stacked auto-encoder method, etc.), a dimensionality reduction method (e.g., principal component analysis, partial least squares regression, Sammon mapping, multidimensional scaling, projection pursuit, etc.), an ensemble method (e.g., boosting, bootstrapped aggregation, AdaBoost, stacked generalization, gradient boosting machine method, random forest method, etc.), and/or any suitable form of machine learning algorithm.

As used herein, "machine learning model" may refer to a mathematical model generated by machine learning algorithms based on sample data, known as training data, to make predictions or decisions without being explicitly programmed to do so. The machine learning model represents what was learned by the machine learning algorithm and represents the rules, numbers, and any other algorithm-specific data structures required to for classification.

The present invention provides the functional benefit of dynamically changing the security awareness of nodes to according to the actions of nodes in their immediate vicinity (e.g., adjacent nodes). As certain nodes escalate their level of security in response to some measurable traffic pattern or network parameter calling for heightened security, the present invention detects this escalation and reacts accordingly by implementing corresponding security changes to nodes in its immediate vicinity. Thus, nodes in the immediate vicinity may implement similar policies and a "ripple effect" may occur throughout nodes which are one, two, or three degrees of separation away from the original node where the security issue was originally identified. In some cases, the level of heightened security may lessen as the degree of separation increases, so the ripple effect may lessen gradually depending on network-distance from the originally affected node. To this end, machine learning may be implemented to analyze effectiveness of heightened security awareness controls and accuracy of security indications in hindsight in order to identify which security patterns and safety implementations are most helpful.

Figure 1:
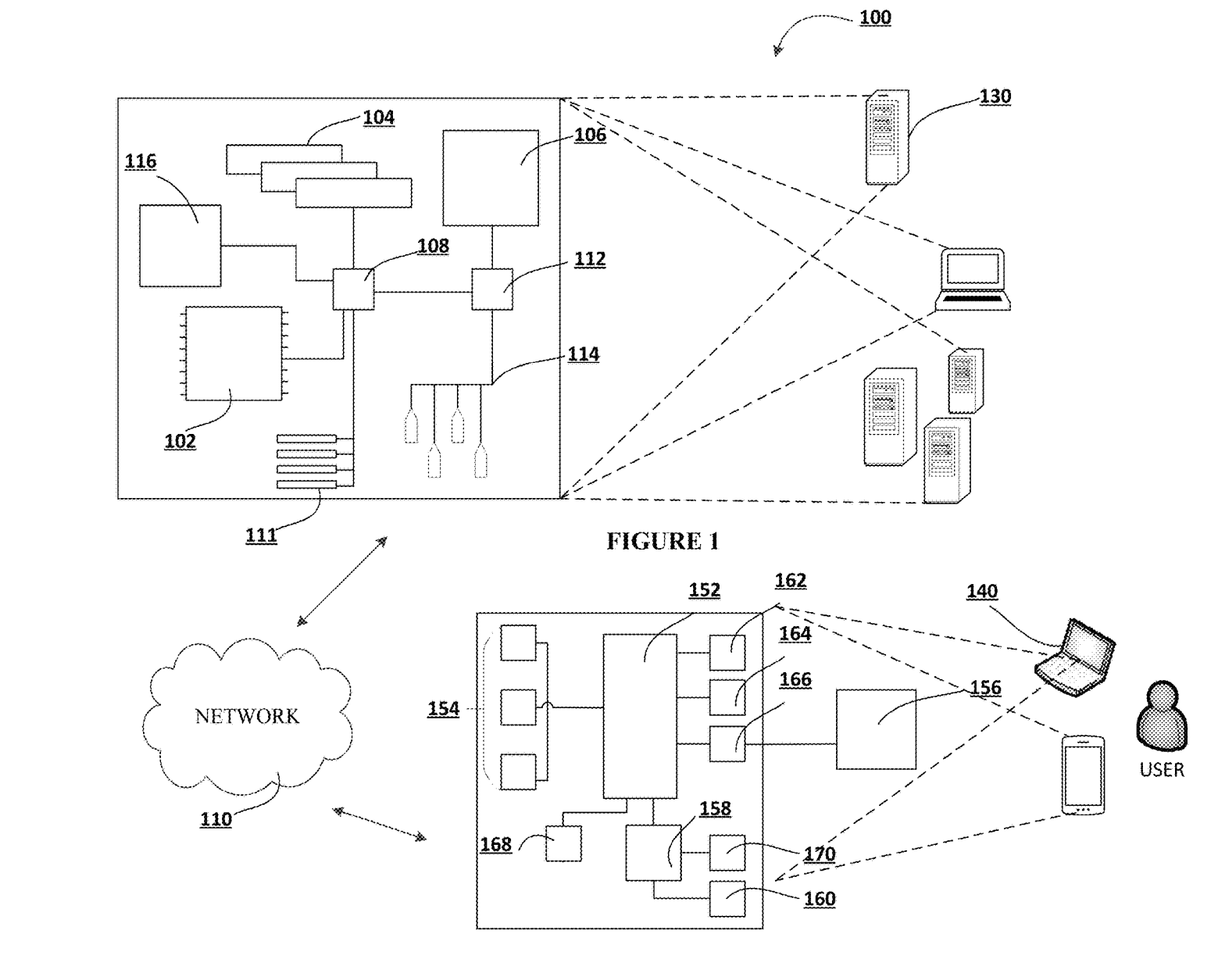
FIG. 1 illustrates technical components of a system for dynamic node analysis for network security response, in accordance with an embodiment of the invention.

FIG. 1 illustrates technical components of a system for dynamic node analysis for network security response 100, in accordance with an embodiment of the invention. FIG. 1 provides a unique system that includes specialized servers and system communicably linked across a distributive network of nodes required to perform the functions of the process flows described herein in accordance with embodiments of the present invention.

As illustrated, the system environment 100 includes a network 110, a system 130, and a user input device 140. In some embodiments, the system 130, and the user input device 140 may be used to implement the processes described herein, in accordance with an embodiment of the present invention. In this regard, the system 130 and/or the user input device 140 may include one or more applications stored thereon that are configured to interact with one another to implement any one or more portions of the various user interfaces and/or process flow described herein.

In accordance with embodiments of the invention, the system 130 is intended to represent various forms of networked computing devices, such as laptops, desktops, video recorders, audio/video player, radio, workstations, servers, wearable devices, Internet-of-things devices, electronic kiosk devices, blade servers, mainframes, or any combination of the aforementioned. In accordance with embodiments of the invention, the user input device 140 is intended to represent various forms of digital computers, such as laptops, desktops, personal digital assistants, cellular telephones, and other similar computing devices. The components shown here, their connections and relationships, and their functions, are meant to be exemplary only, and are not meant to limit implementations of the inventions described and/or claimed in this document.

In accordance with some embodiments, the system 130 may include a processor 102, memory 104, a storage device 106, a high-speed interface 108 connecting to memory 104, and a low-speed interface 112 connecting to low speed bus 114 and storage device 106. Each of the components 102, 104, 106, 108, 111, and 112 are interconnected using various buses, and may be mounted on a common motherboard or in other manners as appropriate. The processor 102 can process instructions for execution within the system 130, including instructions stored in the memory 104 or on the storage device 106 to display graphical information for a GUI on an external input/output device, such as display 116 coupled to a high-speed interface 108. In other implementations, multiple processors and/or multiple buses may be used, as appropriate, along with multiple memories and types of memory. Also, multiple systems, same or similar to system 130 may be connected, with each system providing portions of the necessary operations (e.g., as a server bank, a group of blade servers, or a multi-processor system). In some embodiments, the system 130 may be a server managed by the business. The system 130 may be located at the facility associated with the business or remotely from the facility associated with the business.

The memory 104 stores information within the system 130. In one implementation, the memory 104 is a volatile memory unit or units, such as volatile random access memory (RAM) having a cache area for the temporary storage of information. In another implementation, the memory 104 is a non-volatile memory unit or units. The memory 104 may also be another form of computer-readable medium, such as a magnetic or optical disk, which may be embedded and/or may be removable. The non-volatile memory may additionally or alternatively include an EEPROM, flash memory, and/or the like. The memory 104 may store any one or more of pieces of information and data used by the system in which it resides to implement the functions of that system. In this regard, the system may dynamically utilize the volatile memory over the non-volatile memory by storing multiple pieces of information in the volatile memory, thereby reducing the load on the system and increasing the processing speed.

The storage device 106 is capable of providing mass storage for the system 130. In one aspect, the storage device 106 may be or contain a computer-readable medium, such as a floppy disk device, a hard disk device, an optical disk device, or a tape device, a flash memory or other similar solid state memory device, or an array of devices, including devices in a storage area network or other configurations. A computer program product can be tangibly embodied in an information carrier. The computer program product may also contain instructions that, when executed, perform one or more methods, such as those described above. The information carrier may be a non-transitory computer- or machine-readable storage medium, such as the memory 104, the storage device 104, or memory on processor 102.

The high-speed interface 108 manages bandwidth-intensive operations for the system 130, while the low speed controller 112 manages lower bandwidth-intensive operations. Such allocation of functions is exemplary only. In some embodiments, the high-speed interface 108 is coupled to memory 104, display 116 (e.g., through a graphics processor or accelerator), and to high-speed expansion ports 111, which may accept various expansion cards (not shown). In such an implementation, low-speed controller 112 is coupled to storage device 106 and low-speed expansion port 114. The low-speed expansion port 114, which may include various communication ports (e.g., USB, Bluetooth, Ethernet, wireless Ethernet), may be coupled to one or more input/output devices, such as a keyboard, a pointing device, a scanner, or a networking device such as a switch or router, e.g., through a network adapter.

The system 130 may be implemented in a number of different forms, as shown in FIG. 1. For example, it may be implemented as a standard server, or multiple times in a group of such servers. Additionally, the system 130 may also be implemented as part of a rack server system or a personal computer such as a laptop computer. Alternatively, components from system 130 may be combined with one or more other same or similar systems and an entire system 130 may be made up of multiple computing devices communicating with each other. In some embodiments, the system 130 may be configured to access, via the network 110, a number of other networked computing devices (not shown) in addition to the user input device 140 such as access points, routers, hubs switches, bridges, gateways, modems, repeaters, and/or the like.

FIG. 1 also illustrates a user input device 140, in accordance with an embodiment of the invention. The user input device 140 includes a processor 152, memory 154, an input/output device such as a display 156, a communication interface 158, and a transceiver 160, among other components. The user input device 140 may also be provided with a storage device, such as a microdrive or other device, to provide additional storage. Each of the components 152, 154, 158, and 160, are interconnected using various buses, and several of the components may be mounted on a common motherboard or in other manners as appropriate.

The processor 152 is configured to execute instructions within the user input device 140, including instructions stored in the memory 154. The processor may be implemented as a chipset of chips that include separate and multiple analog and digital processors. The processor may be configured to provide, for example, for coordination of the other components of the user input device 140, such as control of user interfaces, applications run by user input device 140, and wireless communication by user input device 140.

The processor 152 may be configured to communicate with the user through control interface 164 and display interface 166 coupled to a display 156. The display 156 may be, for example, a TFT LCD (Thin-Film-Transistor Liquid Crystal Display) or an OLED (Organic Light Emitting Diode) display, or other appropriate display technology. The display interface 156 may comprise appropriate circuitry and configured for driving the display 156 to present graphical and other information to a user. The control interface 164 may receive commands from a user and convert them for submission to the processor 152. In addition, an external interface 168 may be provided in communication with processor 152, so as to enable near area communication of user input device 140 with other devices. External interface 168 may provide, for example, for wired communication in some implementations, or for wireless communication in other implementations, and multiple interfaces may also be used.

The memory 154 stores information within the user input device 140. The memory 154 can be implemented as one or more of a computer-readable medium or media, a volatile memory unit or units, or a non-volatile memory unit or units. Expansion memory may also be provided and connected to user input device 140 through an expansion interface (not shown), which may include, for example, a SIMM (Single In Line Memory Module) card interface. Such expansion memory may provide extra storage space for user input device 140 or may also store applications or other information therein. In some embodiments, expansion memory may include instructions to carry out or supplement the processes described above and may include secure information also. For example, expansion memory may be provided as a security module for user input device 140 and may be programmed with instructions that permit secure use of user input device 140. In addition, secure applications may be provided via the SIMM cards, along with additional information, such as placing identifying information on the SIMM card in a non-hackable manner. In some embodiments, the user may use the applications to execute processes described with respect to the process flows described herein. Specifically, the application executes the process flows described herein.

The memory 154 may include, for example, flash memory and/or NVRAM memory. In one aspect, a computer program product is tangibly embodied in an information carrier. The computer program product contains instructions that, when executed, perform one or more methods, such as those described herein. The information carrier is a computer- or machine-readable medium, such as the memory 154, expansion memory, memory on processor 152, or a propagated signal that may be received, for example, over transceiver 160 or external interface 168.

In some embodiments, the user may use the user input device 140 to transmit and/or receive information or commands to and from the system 130 via the network 110. Any communication between the system 130 and the user input device 140 (or any other computing devices) may be subject to an authentication protocol allowing the system 130 to maintain security by permitting only authenticated users (or processes) to access the protected resources of the system 130, which may include servers, databases, applications, and/or any of the components described herein. To this end, the system 130 may require the user (or process) to provide authentication credentials to determine whether the user (or process) is eligible to access the protected resources. Once the authentication credentials are validated and the user (or process) is authenticated, the system 130 may provide the user (or process) with permissioned access to the protected resources. Similarly, the user input device 140 (or any other computing devices) may provide the system 130 with permissioned to access the protected resources of the user input device 130 (or any other computing devices), which may include a GPS device, an image capturing component (e.g., camera), a microphone, a speaker, and/or any of the components described herein.

The user input device 140 may communicate with the system 130 (and one or more other devices) wirelessly through communication interface 158, which may include digital signal processing circuitry where necessary. Communication interface 158 may provide for communications under various modes or protocols, such as GSM voice calls, SMS, EMS, or MMS messaging, CDMA, TDMA, PDC, WCDMA, CDMA2000, or GPRS, among others. Such communication may occur, for example, through radio-frequency transceiver 160. In addition, short-range communication may occur, such as using a Bluetooth, Wi-Fi, or other such transceiver (not shown). In addition, GPS (Global Positioning System) receiver module 170 may provide additional navigation—and location-related wireless data to user input device 140, which may be used as appropriate by applications running thereon, and in some embodiments, one or more applications operating on the system 130.

The user input device 140 may also communicate audibly using audio codec 162, which may receive spoken information from a user and convert it to usable digital information. Audio codec 162 may likewise generate audible sound for a user, such as through a speaker, e.g., in a handset of user input device 140. Such sound may include sound from voice telephone calls, may include recorded sound (e.g., voice messages, music files, etc.) and may also include sound generated by one or more applications operating on the user input device 140, and in some embodiments, one or more applications operating on the system 130.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

To provide for interaction with a user, the systems and techniques described here can be implemented on a computer having a display device (e.g., a CRT (cathode ray tube) or LCD (liquid crystal display) monitor) for displaying information to the user and a keyboard and a pointing device (e.g., a mouse or a trackball) by which the user can provide input to the computer. Other kinds of devices can be used to provide for interaction with a user as well; for example, feedback provided to the user can be any form of sensory feedback (e.g., visual feedback, auditory feedback, or tactile feedback); and input from the user can be received in any form, including acoustic, speech, or tactile input.

The systems and techniques described here can be implemented in a technical environment that includes a back end component (e.g., as a data server), that includes a middleware component (e.g., an application server), that includes a front end component (e.g., a client computer having a graphical user interface or a Web browser through which a user can interact with an implementation of the systems and techniques described here), or any combination of such back end, middleware, or front end components.

As shown in FIG. 1, the components of the system 130 and the user input device 140 are interconnected using the network 110. The network 110, which may be include one or more separate networks, be a form of digital communication network such as a telecommunication network, a local area network ("LAN"), a wide area network ("WAN"), a global area network ("GAN"), the Internet, or any combination of the foregoing. It will also be understood that the network 110 may be secure and/or unsecure and may also include wireless and/or wired and/or optical interconnection technology.

In accordance with an embodiments of the invention, the components of the system environment 100, such as the system 130 and the user input device 140 may have a client-server relationship, where the user input device 130 makes a service request to the system 130, the system 130 accepts the service request, processes the service request, and returns the requested information to the user input device 140, and vice versa. This relationship of client and server typically arises by virtue of computer programs running on the respective computers and having a client-server relationship to each other.

It will be understood that the embodiment of the system environment 100 illustrated in FIG. 1 is exemplary and that other embodiments may vary. As another example, in some embodiments, the system environment may include more, fewer, or different components. As another example, in some embodiments, some or all of the portions of the system environment 100 may be combined into a single portion. Likewise, in some embodiments, some or all of the portions of the system 130 may be separated into two or more distinct portions.

Figure 2:
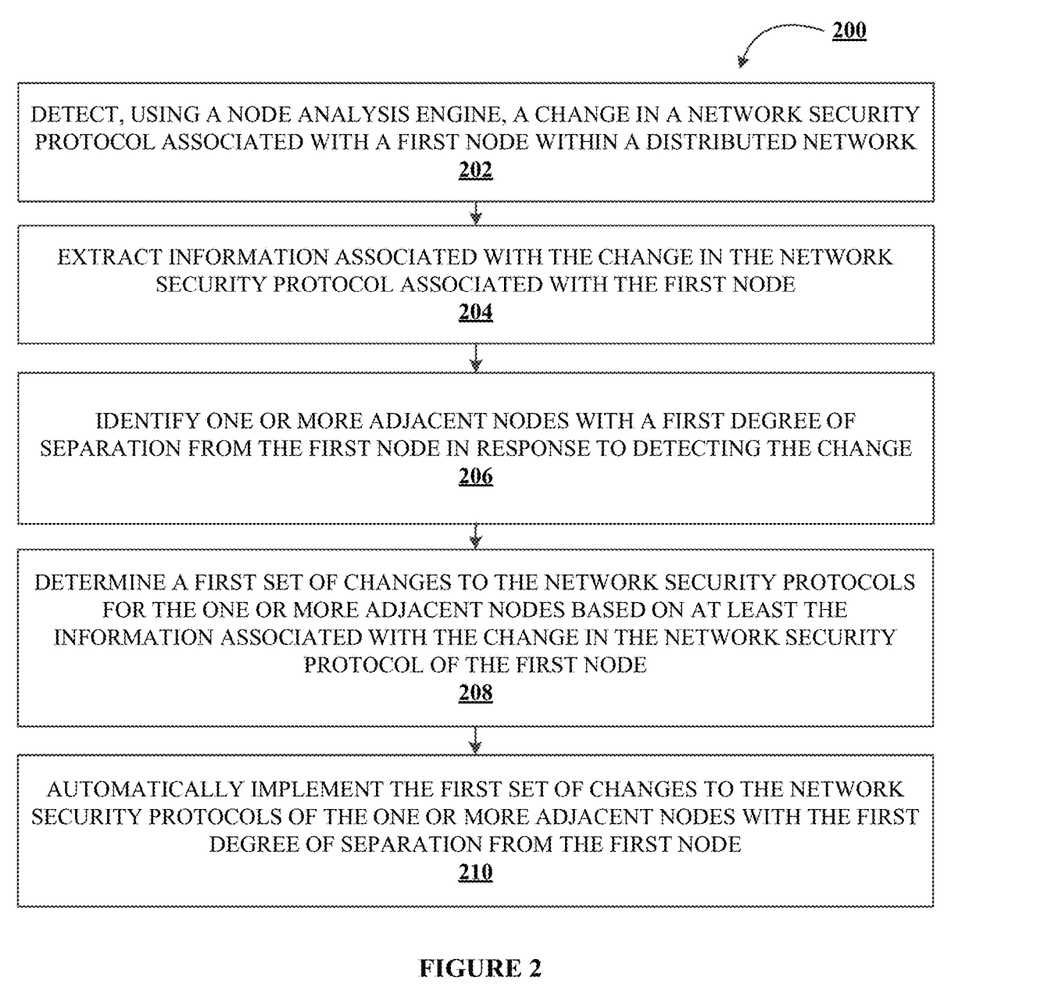
FIG. 2 illustrates a process flow for dynamic node analysis for network security response, in accordance with an embodiment of the invention.

FIG. 2 illustrates a process flow for dynamic node analysis for network security response 200, in accordance with an embodiment of the invention. As shown in block 202, the process flow includes detecting, using a node analysis engine, a change in a network security protocol associated with a first node within a distributed network. To this end, the system may be configured to continuously monitor, using the node analysis engine, the status of the network security protocols associated with the one or more nodes within the distributed network. In some embodiments, the network security protocol may include one or more security controls—safeguards or countermeasures to avoid, detect, counteract, or minimize security exposure to the technology infrastructure. As such, monitoring the status of the network security protocol may include monitoring the status of each security control associated with the network security protocol. In some embodiments, the security controls may include at least a timeout adjustment, an authentication escalation, a re-authentication requirement, a bandwidth restriction adjustment, a communication technology requirement and/ or the like.

Next, as shown in block 204, the process flow includes extracting information associated with the change in the network security protocol associated with the first node. In some embodiments, the information associated with the change in the network security protocol may include a change in the status of at least one corresponding security control. Each security control may be associated with a status that is based on a level of perceived exposure by that node. Each node may be configured to dynamically change the status of a security control in response to detecting specific exposure patterns. In one example, a node may detect that an unknown device is attempting access and has failed its authentication requirement twice. In response, the node, which otherwise requires only a single factor authentication (initial status) may dynamically change its authorization requirement to two-factor authentication (status change). In another example, a node may detect that a person in an authorized session is downloading an unusually large amount of data. In response, the node, which may otherwise not have a session timeout requirement (initial change), may dynamically implement a session timeout, and require an authentication escalation (status change) to continue the data transfer. In some embodiments, by capturing the information associated with the change in the status of at least one security control, the system may be configured to determine that the change is significant enough to require a corresponding change in the status of security controls of one or more adjacent nodes.

Next, as shown in block 206, the process flow includes identifying one or more adjacent nodes with a first degree of separation from the first node in response to detecting the change. Depending on the network topology of the technology infrastructure, each node may be associated with a degree, i.e., number of connections or edges it has to other nodes. Nodes that share an edge with another node are considered to have a first degree of separation. Nodes that are connected to each other via a shared node, where the shared node has a first degree of separation with both the nodes, are considered to have a second degree of separation, and so on. In other words, the number of edges between two nodes is used to define the degree of separation between them.

Next, as shown in block 208, the process flow includes determining a first set of changes to the network security protocols for the one or more adjacent nodes based on at least the information associated with the change in the network security protocol of the first node. In this regard, the system may be configured to use machine learning techniques to identify the first set of changes to be made to the network security protocols for the adjacent nodes. To this end, the system may be configured to initiate a machine learning model on the information associated with the change in the network security protocol associated with the first node. As described herein, a machine learning model may refer to a mathematical model generated by machine learning algorithms based on sample data, known as training data, to make predictions or decisions without being explicitly programmed to do so. Using the machine learning model, the system may be configured to classify the change in the network security protocol associated with the first node into predetermined classes, where each class is associated with preset changes to security controls associated with the network security protocols. Based on the classification, the system may be configured to determine the first set of changes to the network security protocols for the one or more adjacent nodes from preset changes associated with that class.

In some embodiments, the predetermined classes may be labelled and defined based on at least a security control type. For example, Class Label A may include preset changes to network security protocols that are intended to prevent an incident from occurring, i.e., preventative controls, Class Label B may include preset changes to network security protocols that are intended to identify and characterize an incident in progress, i.e., detective controls, Class Label C may include preset changes to network security protocols that are intended to limit the extent of any damage cause by the incident, i.e., corrective controls, and so on. Thus, when the machine learning model classifies the change in the network security protocol associated with the first node, it may classify the change into one or more classes and assign a degree of membership (in the form of a percentage or equivalent) to each class. Based on the class and the degree of membership, the system may be configured to choose the first set of changes to the network security protocols for the one or more adjacent nodes from the preset changes to network security protocols associated with each class.

To generate the machine learning model capable of classifying the change in the network security protocol associated with the first node, the machine learning model has to be trained using past changes to the network security protocols in the nodes and corresponding responsive changes to the network security protocols in their adjacent nodes with first degree of separation. Accordingly, the system may be configured to retrieve, from a data repository, changes detected to the network security protocols associated with one or more nodes in the past and the responsive sets of changes to the network security protocols of their adjacent nodes with first degree of separation. The changes detected to the network security protocols associated with one or more nodes in the past and the responsive sets of changes to the network security protocols of their adjacent nodes with first degree of separation form the training dataset for the machine learning model. Next, the system may be configured to train the machine learning using the training dataset by initiating the machine learning algorithm on the training dataset. Once trained, the system may be configured to determine classification parameters for the machine learning model that are then used to process unseen changes in the network security protocol of a particular node to identify a particular set of changes to the network security protocols in its adjacent nodes with a first degree of separation.

Next, as shown in block 210, the process flow includes automatically implementing the first set of changes to the network security protocols of the one or more adjacent nodes with the first degree of separation from the first node. In some embodiments, implementing the first set of changes may include implementing specific changes in the status of the associated security controls. In some embodiments, should the change in the network security protocol of the first node revert to its initial state at some point in the future, the system may be configured to automatically revert the first set of changes to the network security protocols of the one or more adjacent nodes with the first degree of separation to their initial state in response.

In some embodiments, in addition to determining the first set of changes to the network security protocols of the one or more adjacent nodes with the first degree of separation from the first node, the system may be configured to determine a second set of changes to the network security protocols of the one or more adjacent nodes with the second degree of separation from the first node in a similar way. Accordingly, the system may be configured to identify one or more adjacent nodes with a second degree of separation from the first node in response to detecting the change. In response, the system may be configured to determine a second set of changes to the network security protocols for the one or more adjacent nodes with the second degree of separation from the first node based on at least the information associated with the change in the network security protocol of the first node and the first set of changes implemented to the network security protocols of the one or more adjacent nodes with the first degree of separation from the first node. In response, the system may be configured to automatically implement the second set of changes to the network security protocols of the one or more adjacent nodes with the second degree of separation from the first node.

As will be appreciated by one of ordinary skill in the art in view of this disclosure, the present invention may include and/or be embodied as an apparatus (including, for example, a system, machine, device, computer program product, and/or the like), as a method (including, for example, a business method, computer-implemented process, and/or the like), or as any combination of the foregoing. Accordingly, embodiments of the present invention may take the form of an entirely business method embodiment, an entirely software embodiment (including firmware, resident software, micro-code, stored procedures in a database, or the like), an entirely hardware embodiment, or an embodiment combining business method, software, and hardware aspects that may generally be referred to herein as a "system." Furthermore, embodiments of the present invention may take the form of a computer program product that includes a computer-readable storage medium having one or more computer-executable program code portions stored therein. As used herein, a processor, which may include one or more processors, may be "configured to" perform a certain function in a variety of ways, including, for example, by having one or more general-purpose circuits perform the function by executing one or more computer-executable program code portions embodied in a computer-readable medium, and/or by having one or more application-specific circuits perform the function.

It will be understood that any suitable computer-readable medium may be utilized. The computer-readable medium may include, but is not limited to, a non-transitory computer-readable medium, such as a tangible electronic, magnetic, optical, electromagnetic, infrared, and/or semiconductor system, device, and/or other apparatus. For example, in some embodiments, the non-transitory computer-readable medium includes a tangible medium such as a portable computer diskette, a hard disk, a random access memory (RAM), a read-only memory (ROM), an erasable programmable read-only memory (EPROM or Flash memory), a compact disc read-only memory (CD-ROM), and/or some other tangible optical and/or magnetic storage device. In other embodiments of the present invention, however, the computer-readable medium may be transitory, such as, for example, a propagation signal including computer-executable program code portions embodied therein.

One or more computer-executable program code portions for carrying out operations of the present invention may include object-oriented, scripted, and/or unscripted programming languages, such as, for example, Java, Perl, Smalltalk, C++, SAS, SQL, Python, Objective C, JavaScript, and/or the like. In some embodiments, the one or more computer-executable program code portions for carrying out operations of embodiments of the present invention are written in conventional procedural programming languages, such as the "C" programming languages and/or similar programming languages. The computer program code may alternatively or additionally be written in one or more multi-paradigm programming languages, such as, for example, F #.

Some embodiments of the present invention are described herein with reference to flowchart illustrations and/or block diagrams of apparatus and/or methods. It will be understood that each block included in the flowchart illustrations and/or block diagrams, and/or combinations of blocks included in the flowchart illustrations and/or block diagrams, may be implemented by one or more computer-executable program code portions. These one or more computer-executable program code portions may be provided to a processor of a general purpose computer, special purpose computer, and/or some other programmable data processing apparatus in order to produce a particular machine, such that the one or more computer-executable program code portions, which execute via the processor of the computer and/or other programmable data processing apparatus, create mechanisms for implementing the steps and/or functions represented by the flowchart(s) and/or block diagram block(s).

The one or more computer-executable program code portions may be stored in a transitory and/or non-transitory computer-readable medium (e.g. a memory) that can direct, instruct, and/or cause a computer and/or other programmable data processing apparatus to function in a particular manner, such that the computer-executable program code portions stored in the computer-readable medium produce an article of manufacture including instruction mechanisms which implement the steps and/or functions specified in the flowchart(s) and/or block diagram block(s).

The one or more computer-executable program code portions may also be loaded onto a computer and/or other programmable data processing apparatus to cause a series of operational steps to be performed on the computer and/or other programmable apparatus. In some embodiments, this produces a computer-implemented process such that the one or more computer-executable program code portions which execute on the computer and/or other programmable apparatus provide operational steps to implement the steps specified in the flowchart(s) and/or the functions specified in the block diagram block(s). Alternatively, computer-implemented steps may be combined with, and/or replaced with, operator- and/or human-implemented steps in order to carry out an embodiment of the present invention.

Although many embodiments of the present invention have just been described above, the present invention may be embodied in many different forms and should not be construed as limited to the embodiments set forth herein; rather, these embodiments are provided so that this disclosure will satisfy applicable legal requirements. Also, it will be understood that, where possible, any of the advantages, features, functions, devices, and/or operational aspects of any of the embodiments of the present invention described and/or contemplated herein may be included in any of the other embodiments of the present invention described and/or contemplated herein, and/or vice versa. In addition, where possible, any terms expressed in the singular form herein are meant to also include the plural form and/or vice versa, unless explicitly stated otherwise. Accordingly, the terms "a" and/or "an" shall mean "one or more," even though the phrase "one or more" is also used herein. Like numbers refer to like elements throughout.

While certain exemplary embodiments have been described and shown in the accompanying drawings, it is to be understood that such embodiments are merely illustrative of and not restrictive on the broad invention, and that this invention not be limited to the specific constructions and arrangements shown and described, since various other changes, combinations, omissions, modifications and substitutions, in addition to those set forth in the above paragraphs, are possible. Those skilled in the art will appreciate that various adaptations, modifications, and combinations of the just described embodiments can be configured without departing from the scope and spirit of the invention. Therefore, it is to be understood that, within the scope of the appended claims, the invention may be practiced other than as specifically described herein.

What is claimed is:

1. A system for dynamic node analysis for network security response, the system comprising:
   a processor;
   a non-transitory storage device containing instructions that, when executed by the processor, cause the processor to:
   detect, using a node analysis engine, a change in a network security protocol associated with a first node within a distributed network;
   extract information associated with the change in the network security protocol associated with the first node;
   identify one or more adjacent nodes with a first degree of separation from the first node in response to detecting the change;
   determine a first set of changes to the network security protocols for the one or more adjacent nodes based on at least the information associated with the change in the network security protocol of the first node, wherein determining the first set of changes further comprises:
      initiating a machine learning model on the information associated with the change in the network security protocol associated with the first node;
      classifying, using the machine learning model, the change in the network security protocol associated with the first node into one or more classes;
      retrieving one or more preset changes to the network security protocols associated with the one or more classes; and
      determining the first set of changes to the network security protocols for the one or more adjacent nodes from the one or more preset changes; and
   automatically implement the first set of changes to the network security protocols of the one or more adjacent nodes with the first degree of separation from the first node.

2. The system of claim 1, wherein the network security protocol comprises at least one or more security controls, wherein the one or more security controls comprises at least a timeout adjustment, an authentication escalation, a re-authentication requirement, a bandwidth restriction adjustment, and/or a communication technology requirement.

3. The system of claim 1, wherein the instructions, when executed, further cause the processor to:
   continuously monitor, using the node analysis engine, the network security protocols associated with the one or more nodes within the distributed network; and
   detect the change in the network security protocol associated with the first node based on at least the continuous monitoring.

4. The system of claim 1, wherein the instructions, when executed, further cause the processor to:
   retrieve, from a data repository, one or more detected changes to the network security protocols associated with one or more nodes;
   retrieve, from the data repository, one or more sets of changes to the network security protocols of the one or more adjacent nodes with the first degree of separation from the one or more nodes implemented in response to the one or more detected changes;
   initiate a machine learning algorithm on the one or more detected changes to the network security protocols associated with the one or more nodes and one or more sets of changes to the network security protocols of the one or more adjacent nodes with the first degree of separation from the one or more nodes; and
   train, using the machine learning algorithm, the machine learning model, wherein training further comprises determining one or more classification parameters for the machine learning model.

5. The system of claim 4, wherein the instructions, when executed, further cause the processor to:
   classify, using the one or more classification parameters, the change in the network security protocol associated with the first node into the one or more classes.

6. The system of claim 1, wherein the instructions, when executed, further cause the processor to:
- identify one or more adjacent nodes with a second degree of separation from the first node in response to detecting the change;
- determine a second set of changes to the network security protocols for the one or more adjacent nodes with the second degree of separation from the first node based on at least the information associated with the change in the network security protocol of the first node and the first set of changes implemented to the network security protocols of the one or more adjacent nodes with the first degree of separation from the first node; and
- automatically implement the second set of changes to the network security protocols of the one or more adjacent nodes with the second degree of separation from the first node.

7. A computer program product for dynamic node analysis for network security response, the computer program product comprising a non-transitory computer-readable medium comprising code causing a first apparatus to:
- detect, using a node analysis engine, a change in a network security protocol associated with a first node within a distributed network;
- extract information associated with the change in the network security protocol associated with the first node;
- identify one or more adjacent nodes with a first degree of separation from the first node in response to detecting the change;
- determine a first set of changes to the network security protocols for the one or more adjacent nodes based on at least the information associated with the change in the network security protocol of the first node, wherein determining the first set of changes further comprises:
  - initiating a machine learning model on the information associated with the change in the network security protocol associated with the first node;
  - classifying, using the machine learning model, the change in the network security protocol associated with the first node into one or more classes;
  - retrieving one or more preset changes to the network security protocols associated with the one or more classes; and
  - determining the first set of changes to the network security protocols for the one or more adjacent nodes from the one or more preset changes; and
- automatically implement the first set of changes to the network security protocols of the one or more adjacent nodes with the first degree of separation from the first node.

8. The computer program product of claim 7, wherein the network security protocol comprises at least one or more security controls, wherein the one or more security controls comprises at least a timeout adjustment, an authentication escalation, a re-authentication requirement, a bandwidth restriction adjustment, and/or a communication technology requirement.

9. The computer program product of claim 7, wherein the code further causes the first apparatus to:
- continuously monitor, using the node analysis engine, the network security protocols associated with the one or more nodes within the distributed network; and
- detect the change in the network security protocol associated with the first node based on at least the continuous monitoring.

10. The computer program product of claim 7, wherein the code further causes the first apparatus to:
- retrieve, from a data repository, one or more detected changes to the network security protocols associated with one or more nodes;
- retrieve, from the data repository, one or more sets of changes to the network security protocols of the one or more adjacent nodes with the first degree of separation from the one or more nodes implemented in response to the one or more detected changes;
- initiate a machine learning algorithm on the one or more detected changes to the network security protocols associated with the one or more nodes and one or more sets of changes to the network security protocols of the one or more adjacent nodes with the first degree of separation from the one or more nodes; and
- train, using the machine learning algorithm, the machine learning model, wherein training further comprises determining one or more classification parameters for the machine learning model.

11. The computer program product of claim 10, wherein the code further causes the first apparatus to:
- classify, using the one or more classification parameters, the change in the network security protocol associated with the first node into the one or more classes.

12. The computer program product of claim 7, wherein the code further causes the first apparatus to:
- identify one or more adjacent nodes with a second degree of separation from the first node in response to detecting the change;
- determine a second set of changes to the network security protocols for the one or more adjacent nodes with the second degree of separation from the first node based on at least the information associated with the change in the network security protocol of the first node and the first set of changes implemented to the network security protocols of the one or more adjacent nodes with the first degree of separation from the first node; and
- automatically implement the second set of changes to the network security protocols of the one or more adjacent nodes with the second degree of separation from the first node.

13. A method for dynamic node analysis for network security response, the method comprising:
- detecting, using a node analysis engine, a change in a network security protocol associated with a first node within a distributed network;
- extracting information associated with the change in the network security protocol associated with the first node;
- identifying one or more adjacent nodes with a first degree of separation from the first node in response to detecting the change;
- determining a first set of changes to the network security protocols for the one or more adjacent nodes based on at least the information associated with the change in the network security protocol of the first node, wherein determining the first set of changes further comprises:
  - initiating a machine learning model on the information associated with the change in the network security protocol associated with the first node;
  - classifying, using the machine learning model, the change in the network security protocol associated with the first node into one or more classes;
  - retrieving one or more preset changes to the network security protocols associated with the one or more classes; and determining the first set of changes to the network security protocols for the one or more adjacent nodes from the one or more preset changes; and automatically implementing the first set of changes to the network security protocols of the one or more adjacent nodes with the first degree of separation from the first node.

14. The method of claim 13, wherein the network security protocol comprises at least one or more security controls, wherein the one or more security controls comprises at least a timeout adjustment, an authentication escalation, a re-authentication requirement, a bandwidth restriction adjustment, and/or a communication technology requirement.

15. The method of claim 13, wherein the method further comprises:

continuously monitoring, using the node analysis engine, the network security protocols associated with the one or more nodes within the distributed network; and detecting the change in the network security protocol associated with the first node based on at least the continuous monitoring.

16. The method of claim 15, wherein the method further comprises:

retrieving, from a data repository, one or more detected changes to the network security protocols associated with one or more nodes;

retrieving, from the data repository, one or more sets of changes to the network security protocols of the one or more adjacent nodes with the first degree of separation from the one or more nodes implemented in response to the one or more detected changes;

initiating a machine learning algorithm on the one or more detected changes to the network security protocols associated with the one or more nodes and one or more sets of changes to the network security protocols of the one or more adjacent nodes with the first degree of separation from the one or more nodes; and training, using the machine learning algorithm, the machine learning model, wherein training further comprises determining one or more classification parameters for the machine learning model.

17. The method of claim 16, wherein the method further comprises:

classifying, using the one or more classification parameters, the change in the network security protocol associated with the first node into the one or more classes.

* * * * *